Patented Oct. 30, 1945

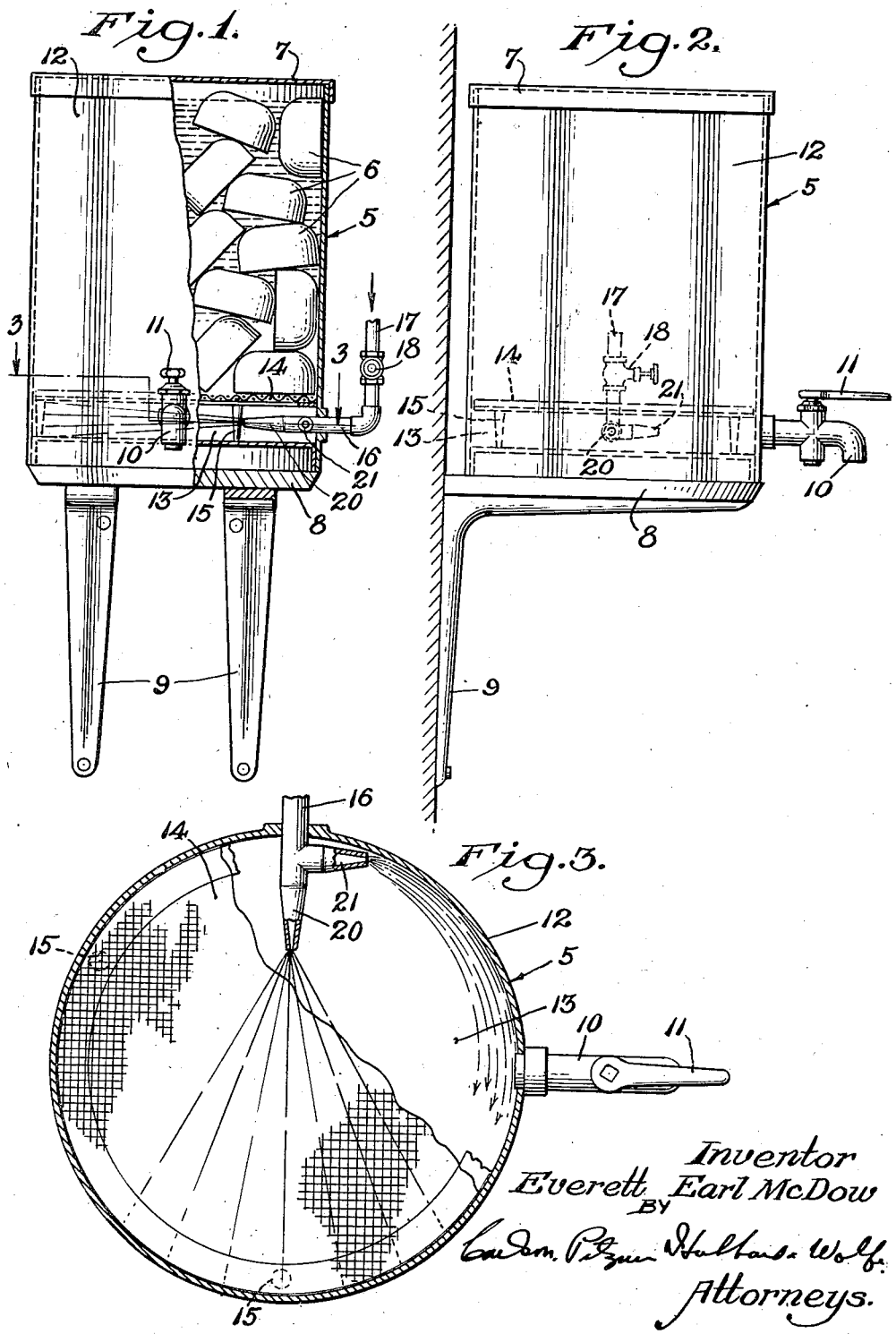

2,387,945

UNITED STATES PATENT OFFICE 2,387,945

DISPENSING APPARATUS

Everett Earl McDow, Wilmette, Ill., assignor to Antiseptol Company, Inc., Chicago, Ill., a corporation of Illinois Application July 29, 1944, Serial No. 547,170

9 Claims. (Cl. 299—84)

The invention relates to the dispensing of washing compounds of the type supplied in the form of water soluble briquettes and has particular reference to improved apparatus for dissolving such compounds and dispensing the solution thus formed.

One object of the invention is to provide improved dispensing apparatus of the above general character adapted for the preparation of substantially saturated water solutions of briquetted washing compounds without requiring the heating of the water.

Another object is to provide dispensing apparatus in which the water for dissolving a briquetted washing compound is introduced in a novel and advantageous manner adapted to insure thorough mixing of the water with any solution left in the apparatus and to effectually prevent obstruction of the outlet by solids deposited or precipitated from the solution.

Other objects and advantages of the invention will become apparent from the following detailed description of the preferred embodiment illustrated in the accompanying drawing in which:

Figure 1 is a transverse vertical sectional view of a dispensing device embodying the features of the invention.

Fig. 2 is a side elevational view of the device.

Fig. 3 is a sectional view taken in a horizontal plane substantially on the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In order to provide for the effective solution of briquetted washing compounds in cold water, I provide a container or tank 5 adapted to hold sufficient briquettes 6 together with water for dissolving the same to produce the amount of solution required for a substantial period of time. The arrangement is such that the briquettes are completely submerged in the water and they are preferably allowed to stand undisturbed for a time, as for example, overnight to insure their dissolution.

The tank 5, which may be constructed of sheet metal or other suitable material, is preferably in the form of a cylindrical drum open at its upper end and fitted with a removable cover 7 to facilitate loading of the briquettes 6 therein. While the tank 5 may be supported in any preferred manner, it has been shown herein as mounted on an elevated shelf 8 carried by conventional wall brackets 9.

The solution is preferably withdrawn from the bottom of the tank 5 through an outlet in the side wall thereof. In the exemplary device, the outlet is fitted with a faucet 10 having the usual manually operable valve 11 for controlling the flow of solution therethrough. To prevent interference with such flow, partitioning means is provided for dividing the tank into upper and lower chambers 12 and 13 between which liquid may flow freely but adapted to confine the briquettes 6 to the upper chamber 12. The partitioning means, as herein shown, comprises a flat grid 14 in the form of a perforated plate or screen extending transversely across the tank and supported by legs 15 or other suitable means in spaced relation to the bottom of the tank.

Provision is made for introducing water into the tank 5 in a novel manner which insures thorough mixing of the same with any unused solution remaining in the tank and which effectually scours out any solid material deposited or precipitated in the lower chamber 13. For this purpose, the tank 5 is provided with an inlet opening adjacent its lower end for the reception of an inlet pipe 16 adapted to be connected with a source of water under pressure such as a pipe 17 forming a part of a water supply system. A manually operable valve 18 is interposed between the pipes for controlling the water supply.

The inlet pipe 16 terminates within the lower chamber 13 of the tank and suitable means is provided in association therewith for directing the flow of incoming water so as to produce a swirling action effective to scour out any solid material deposited in the lower chamber. The directing means, in its preferred form, comprises a pair of nozzles 20 and 21 positioned to direct the incoming water in streams disposed substantially at right angles to each other and in a plane approximately parallel to the bottom wall of the tank 5. Thus the nozzle 20 is positioned to direct a part of the incoming water in a stream substantially diametrically across the lower chamber 13 of the tank while the nozzle 21 is positioned to direct the remainder of the water in a stream along the side wall of the tank. A turbulent flow of water is therefore maintained in the chamber 13 at all times while the tank is being filled and any solid material therein is either dissolved or dislodged and carried up into the upper chamber 12 so that clogging of the outlet is effectually avoided.

To prepare a quantity of washing solutions, the cover 7 is removed from the tank and the upper chamber 12 is substantially filled with briquettes 6 of washing compound. The valve 18 is then opened to admit sufficient water to completely cover the briquettes. During the filling process, the incoming water is directed by the nozzles 20 and 21 so as to perform its mixing and scouring function, thus insuring uniformity of solution and free flow of the same through the outlet.

When the tank is filled substantially to the level indicated in Fig. 1, the valve 18 is closed and the cover 7 replaced. In practice, it has been found desirable to allow the briquettes and water to stand for a substantial length of time, as for example, overnight before the solution is used. During such period, the briquettes dissolve slowly and diffuse through the water thus forming a uniform solution of the compound. This solution may be drawn off for use, when desired, through the faucet 10.

It will be apparent from the foregoing that the invention provides dispensing apparatus of novel and improved construction particularly well adapted for dissolving washing compounds of the type supplied in briquette form and for dispensing the solution thus formed. The apparatus includes a tank adapted to hold a sufficient supply of briquettes and water for dissolving the same to provide a substantial quantity of washing solution ready for instant use. The briquettes are completely submerged in the water in which they are to be dissolved so that the solution may take place slowly, thus permitting the use of cold water. Moreover, provision is made for introducing the water into the tank in a manner which insures complete mixing thereof with any previously formed solution remaining in the tank and which further acts to scour out and remove any solid material deposited in or around the outlet of the tank. Clogging of the outlet is thus effectually prevented.

I claim as my invention:

1. A dispensing device comprising, in combination, a tank having an opening at its upper end for the reception of washing compound in briquette form, partitioning means dividing said tank into upper and lower chambers, said partitioning means permitting free flow of liquid between said chambers while confining said briquettes to the upper chamber, a manually controlled outlet from said lower chamber, means for introducing a supply of water into said lower chamber to substantially fill the tank, and means for directing the flow of incoming water so as to produce a swirling action effective to scour out any solid material deposited in the lower chamber and thereby prevent obstruction of said outlet.

2. A dispensing device comprising, in combination, a tank having an opening at its upper end for the reception of washing compound in briquette form, partitioning means dividing said tank into upper and lower chambers, said partitioning means permitting free flow of liquid in either direction between said chambers while confining said briquettes to the upper chamber, a manually controlled outlet from said lower chamber, means for introducing a supply of water to the tank when said outlet is closed including nozzle means adapted for connection with a source of water under pressure and arranged to direct the incoming water in said lower chamber in a manner effective to scour out any solid material deposited therein and to insure thorough mixing of the water with any previously formed solution remaining in the tank.

3. A dispensing device comprising, in combination, a tank having an opening at its upper end for the reception of washing compound in briquette form, partitioning means dividing said tank into upper and lower chambers, said partitioning means permitting free flow of liquid between said chambers while confining said briquettes to the upper chamber, a manually controlled outlet from said lower chamber, a water inlet pipe opening into said lower chamber, and a pair of nozzles connected with said pipe for effecting a turbulent flow of the incoming water, one of said nozzles being positioned to direct a part of the incoming water in a stream across the chamber, the other of said nozzles being positioned to direct the remainder of the incoming water along the side of the chamber.

4. A dispensing device comprising, in combination, a tank having an opening at its upper end for the reception of washing compound in briquette form, partitioning means dividing said tank into upper and lower chambers, said partitioning means permitting free flow of liquid between said chambers while confining said briquettes to the upper chamber, a manually controlled outlet from said lower chamber, a pair of nozzles in said lower chamber, and a pipe for delivering water to said nozzles, said nozzles being disposed substantially at right angles to each other and in a plane approximately parallel to the bottom wall of the tank.

5. A dispensing device for washing compounds comprising, in combination, a generally cylindrical tank having an upper compartment adapted to receive a quantity of washing compound in the form of water soluble briquettes, a lower chamber communicating with said upper chamber for the free flow of liquid therebetween, said lower chamber having an inlet for water to dissolve said briquettes and an outlet for the solution thus produced, and a pair of nozzles associated with said inlet, one of said nozzles being positioned to direct a part of the incoming water in a stream substantially diametrically across said lower chamber, the other of said nozzles being positioned to direct the remainder of the incoming water in a stream approximately at right angles to the stream produced by said first nozzle.

6. A dispensing device for washing compounds in the form of water soluble briquettes, said device comprising, in combination, a tank having an opening at its upper end for the reception of the briquettes, a partitioning member operative to confine the briquettes to the upper portion of the tank while permitting free flow of liquid between the upper and lower portions thereof, an outlet from the lower portion of the tank controlled by a manually operable valve, an inlet at the lower end of the tank for water to dissolve said briquettes, and manually operable volve means controlling the flow of water through said inlet.

7. A dispensing apparatus for water softening or cleansing compounds, comprising a tank having a bottom wall, means for supporting the compound above and in spaced relation to the bottom wall and defining a lower chamber, valved outlet means for said chamber, and valve controlled inlet means for the supply of water to said chamber when said outlet is closed, said supporting means permitting free communication between said chamber and the upper portion of the tank whereby water introduced into the chamber may rise in the tank about the compound therein, and said inlet means being adapted for connection with a source of water under pressure and being constructed to direct the water in a plurality of streams horizontally of said chamber.

8. A dispensing apparatus for water softening and cleansing compounds, comprising a tank having a bottom wall, means for supporting the compound above and in spaced relation to the bottom wall and defining a lower chamber, valved outlet means for said chamber, and valve controlled inlet means for the supply of water to said chamber when said outlet is closed, the supporting means for the compound permitting free communication between said chamber and the upper portion of the tank whereby water introduced into the chamber may rise in the tank about said compound, and said inlet means being adapted for connection with a source of water under pressure and including a nozzle positioned to direct the incoming water circumferentially of the chamber.

9. A dispensing apparatus for water softening or cleansing compounds, comprising a tank having a bottom wall, means for supporting the compound above and in spaced relation to the bottom wall, valved outlet means at the lower end of the tank, and a valve controlled inlet pipe for supplying water to the lower end of the tank when said outlet is closed, the supporting means for the compound permitting free communication between the upper and lower portion of the tank whereby water introduced into the lower portion may rise in the tank about said compound, and said inlet pipe being adapted for connection to a source of water under pressure and operative to effect the introduction of water into the lower portion of the tank with a turbulent flow.

EVERETT EARL McDOW.